United States Patent
Chuberre et al.

(10) Patent No.: US 6,522,896 B2
(45) Date of Patent: Feb. 18, 2003

(54) ANTENNA DIVERSITY BASE STATION FOR TRANSMISSION OF UNIDIRECTIONAL CHANNELS AND CORRESPONDING METHOD OF TRANSMISSION OF A UNIDIRECTIONAL CHANNEL BY A BASE STATION

(75) Inventors: Nicolas Chuberre, Ramonville (FR); Christian Massy, Sevres (FR); Michèle Lupu, Chilly Mazarin (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/102,002

(22) Filed: Jun. 22, 1998

(65) Prior Publication Data

US 2002/0022502 A1 Feb. 21, 2002

(30) Foreign Application Priority Data

Jun. 23, 1997 (FR) .............................. 97 07773

(51) Int. Cl.⁷ .............................. H04B 1/38; H04M 1/00
(52) U.S. Cl. ...................... 455/562; 455/101; 455/272; 455/279.1; 343/876

(58) Field of Search ................................ 455/561, 562, 455/272, 277.1, 278.1, 511, 101, 269–274, 69, 277.2, 279.1; 343/876

(56) References Cited

U.S. PATENT DOCUMENTS

| 5,459,873 A | | 10/1995 | Moore et al. ............ 455/277.1 |
| 5,507,035 A | * | 4/1996 | Bantz et al. ................ 455/133 |
| 6,131,016 A | * | 10/2000 | Greenstein et al. ........... 455/69 |
| 6,385,464 B1 | * | 5/2002 | Narita et al. ................ 455/561 |

FOREIGN PATENT DOCUMENTS

| EP | 0279080 A2 | 8/1988 |
| EP | 0475681 A2 | 3/1992 |

* cited by examiner

Primary Examiner—Edward F. Urban
Assistant Examiner—Charles Craver
(74) Attorney, Agent, or Firm—Sughrue Mion, PLLC

(57) ABSTRACT

A base station of a radiocommunication system has at least two antennas and can select one of the antennas. It determines if a channel to transmit to at least one mobile station is unidirectional and switches from one antenna to another in accordance with a predetermined random or pseudo-random law if the channel to transmit is unidirectional.

7 Claims, 1 Drawing Sheet

ANTENNA DIVERSITY BASE STATION FOR TRANSMISSION OF UNIDIRECTIONAL CHANNELS AND CORRESPONDING METHOD OF TRANSMISSION OF A UNIDIRECTIONAL CHANNEL BY A BASE STATION

BACKGROUND OF THE INVENTION

1. Field of the Invention

The field of the invention is that of radiocommunication systems. In the present context, "radiocommunication systems" means systems generally called "cordless" systems, for example systems to the DECT (Digital European Cordless Telecommunications) standard or the CT2 (Cordless Telephone 2nd generation) standard and systems generally called "cellular" systems, for example systems to the GSM (Global System for Mobile communication) standard or the DCS 1800 (Digital Communication System) standard. Also, in the present context, these radiocommunication systems can be analog systems or digital systems.

To be more precise, the invention concerns a base station of a radiocommunication system of the above kind.

2. Description of the Prior Art

Each base station covers a given geographical area (or cell) in which mobile stations can move around, each mobile station being a physical equipment used by a user of the network to access the telecommunication services offered.

Depending on the system, the base station is sometimes also called the radio fixed part (RFP), base or terminal. Similarly, the mobile station is sometimes also called a mobile handset, radiocommunication terminal or portable telephone Each base station provides mobile stations in its coverage area with wireless access to the radiocommunication network. To this end, the base stations and the mobile stations exchange information on radio channels. These channels are either traffic channels, if they transmit speech or data, or control channels, if they transmit signaling.

Traffic channels and control channels are usually divided into bidirectional channels and unidirectional channels. A bidirectional channel supports an uplink (mobile station to base station) and a downlink (base station to mobile station). In contrast, a unidirectional channel supports only an uplink or a downlink.

The present description concerns only unidirectional channels (traffic channels or control rue channels) transmitted by the base stations, ie comprising only a downlink However, it should be noted that in the present context "unidirectional channels" means not only "true" unidirectional channels (i.e. designed with only a downlink) but also "false" unidirectional channels (i.e. designed with an uplink and a downlink but temporarily operating in a unidirectional type mode because of an incident on the uplink).

In the context of unidirectional channels transmitted by the base stations, a distinction is drawn between broadcast channels and simplex channels. A broadcast channel is transmitted by a base station to a plurality of mobile stations (point-to-multipoint scheme). A simplex channel is transmitted by a base station to a single mobile station (point-to-point scheme).

The radio signal transmitted by a base station can be subject to rapid fading before it is received by the mobile station or stations which can lead to partial or total corruption of the information conveyed.

Adding an antenna diversity device to the base station to alleviate distortion due to the propagation medium (fading, multipath, etc.) is known in itself, in particular in a DECT type system.

In the case of a bidirectional channel, the base station chooses to receive via one or other of its antennas and the mobile station commands the base station to transmit on one or other of its antennas. In other words, the mobile station compares the quality of the signals received (not simultaneously) from the various antennas of the base station and requests the base station to transmit on the antenna whose signal is received with the best quality.

In the case of a unidirectional channel transmitted by the base station the mobile station cannot command the base station to change the transmitting antenna.

In order to be able to employ the antenna diversity mechanism regardless of this fact, it has been proposed to switch periodically from one antenna to the other in this case. This periodic switching is embodied in a rule of alternation if the base station comprises two antennas or a circular rule if the base station comprises more than two antennas For example, if the station comprises two antennas and if the system is of the TDMA (Time Division Multiple Access) type, i.e. if the unidirectional channel consists in the recurrence of a particular time slot in each frame, then the periodic switching consists in using each antenna for only one frame in two. In other words, in this example, half the frames (and thus half the time slots allocated to the unidirectional channel) are transmitted by one antenna and the other half of the frames (and thus the other half of the time slots allocated to the unidirectional channel) are transmitted by the other antenna.

This prior art technique of switching in accordance with a periodic process assures that the mobile station receives the unidirectional channel half the time on one antenna and half the time on the other antenna Accordingly, even if the signal from one antenna is subject to fading rendering it unusable, it is probable that the signal from the other antenna is not distorted. Consequently, in most cases, this prior art technique prevents fading (or other distortion due to the propagation medium) half the time.

Unfortunately, this prior art technique of switching in accordance with a periodic process does not suit all situations, because it presupposes that the mobile station is listening to the base station at all times.

In particular, it does not suit the situation in which the mobile station listens to the mobile station only intermittently, at regular time intervals. If the listening period and the period for switching between the antennas are multiples of each other the mobile station always listens to (or "sees") the same antenna If the signal transmitted by the only antenna seen by the mobile station is distorted, the link balance between the mobile station and the base station can be strongly degraded or even cancel out. Obviously in this situation antenna diversity is of no use.

A situation of the above kind corresponds, for example, to the situation in which the mobile station is "idle" and listening to the paging channel (a particular control channel) on which it could receive a seek message from the base station in the event of an incoming call. This listening is done in accordance with a predetermined law, generally consisting in listening to only some of the time slots of the paging channel to limit power consumption. If the base station uses two antennas alternately to transmit the successive time slots of the paging channel, and if the mobile station is listening only to one time slot in N of the paging channel (where N is an even number), then the mobile station always listens to time slots transmitted by the same antenna and the effect of antenna diversity is lost.

One objective of the invention is to alleviate this drawback of the prior art.

To be more precise, one objective of the present invention is to provide an antenna diversity base station for transmitting unidirectional channels which further improves the reception of these unidirectional channels by the mobile stations.

Another objective of the invention is to provide a base station of this kind using a technique of switching between antennas that suits all situations and in particular regardless of the law whereby the mobile stations listen to the paging channel.

SUMMARY OF THE INVENTION

These various objectives, together with others that will become apparent hereinafter, are achieved in accordance with the invention with the aid of a base station of a radiocommunication system of the type comprising at least, two antennas and means for selecting one of the antennas, the selector means comprising:

means for determining if a channel to transmit to at least one mobile station is unidirectional, and means for switching from one of the antennas to another in accordance with a predetermined random or pseudo-random law if the determination means indicate to the switching means that the channel to transmit is unidirectional.

Thus, in accordance with the invention, the law of switching between the antennas is a random or pseudo-random law and not a periodic law as in the current state of the art.

Accordingly, regardless of its listening law, a mobile station "sees" all the antennas and can benefit from the advantages of antenna diversity The link balance between the base station and the mobile station is improved 10 dB.

The unidirectional channel advantageously belongs to the group comprising:

channels intended to be unidirectional, and channels not intended to be unidirectional but temporarily having a unidirectional character.

The invention applies equally to "true" unidirectional channels (comprising only a downlink) and to "false" unidirectional channels (comprising an uplink and a downlink but temporarily operating only on the downlink). In other words, the invention applies to all channels on which the base station can contact the mobile station but conversely the mobile station cannot contact the base station.

Each channel designed to be unidirectional advantageously belongs to the group comprising;

broadcast channels each transmitted to a plurality of mobile stations, and simplex channels each transmitted to a single mobile station.

Each broadcast or simplex channel preferably belongs to the group comprising:

traffic channels, control channels,

"dummy bearer" channels, and

"beacon" channels.

The radiocommunication system preferably belongs to the group comprising;

DECT (Digital European Cordless Telecommunications) type systems,

CT1 (Cordless Telephone 1st generation) type systems,

CT2 (Cordless Telephone 2nd generation) type systems,

PCN (Personal Communication System) type systems,

GSM (Global System for Mobile communication) type systems,

DCS 1800 (Digital Communication System) type systems.

The invention also concerns a process for transmission of a unidirectional channel by a base station of a radiocommunication system, the base station comprising at least two antennas and the process comprising the following steps:

determining the unidirectional or non-unidirectional character of a channel to transmit, and switching from one of the antennas to another in accordance with a predetermined random or pseudo-random law it the channel to transmit is unidirectional.

Other features and advantages of the invention will become apparent from the following description of one embodiment of the invention given with reference to the accompanying drawings.

DETAILED DESCRIPTION OF THE PREFERRED EMBODIMENT

The invention therefore concerns a base station 1 the antenna diversity type forming part of a radiocommunication system.

Figure 1:
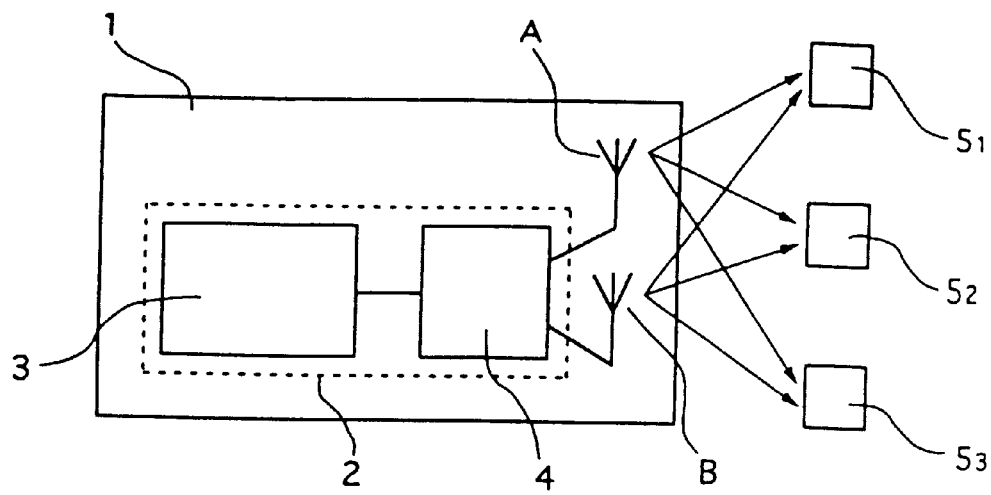
FIG. 1 shows a block schematic of one particular embodiment of a base station in accordance with the invention transmitting a unidirectional channel to a plurality of mobile stations.

In the embodiment shown in FIG. 1 the base station 1 has two antennas A, 3 and means 2 for selecting one of the two antennas A, B for transmission. The selector means 2 comprise:

means 3 for determining if a channel to transmit to one or more mobile stations $5_1$ through $5_3$ is unidirectional, and means 4 for switching from one of the two antennas (for example antenna A) to the other (for example antenna B) in accordance with a predetermined law if the determination means 3 indicate to the switching means 4 that the channel to transmit is unidirectional.

In accordance with the present invention, the predetermined law of switching between the antennas A, B is a random or pseudo-random law. In practise a pseudo-random law is preferred, for reasons of simplicity and cost, using a pseudo-random generator well known to the skilled person. It is nevertheless clear that the invention equally concerns the more complex situation in which the law is really random.

The present invention applies to any, type of radiocommunication system in which each base station transmits at least one unidirectional channel (or at least one channel at least temporarily having a unidirectional character) to at least one mobile station. Accordingly, it can be a system of any of the following types (the following list is in no way exhaustive): DECT, CT1, CT2, PCN, GSM and DCS 1800.

The invention applies generally to any type of broadcast or simplex control or traffic unidirectional channel. Note that by control channel here is meant both dummy bearer channels and beacon channels.

Figure 2:
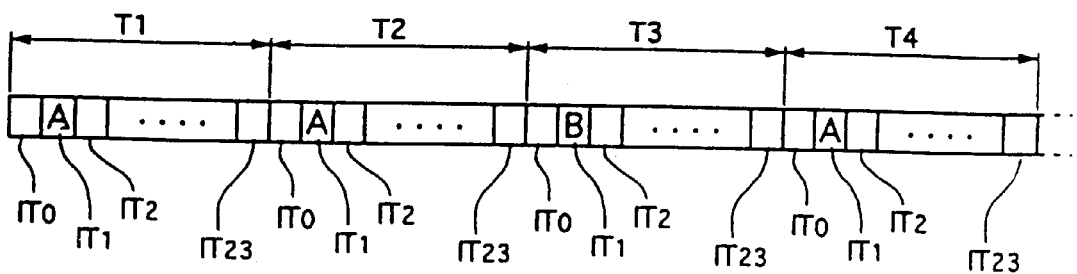
FIG. 2 shows one example of a unidirectional channel used to explain the law in accordance with the invention for switching between antennas.

One example of a unidirectional channel transmitted by the base station from FIG. 1 using the law in accordance with the invention for switching between the antennas A, B will now be explained with reference to FIG. 2.

In this example the unidirectional channel transmitted by the base station is a paging channel broadcast to the plurality of mobile stations $5_1$ through $5_3$.

The system is of the DECT type and uses a combined TDMA/FDMA mode of access. The base station 1 and the mobile stations $5_1$ through $5_3$ transmit and receive alternately in TDMA mode on a given carrier. Each frame T1, T2, T3, T4, etc. is made up of 24 time slots IT0 through IT23. The first 12 time slots IT0 through IT11 are allocated to the downlink (base station to mobile station) for example and the last 12 time slots IT12 through IT23 to the uplink (mobile station to base station) A physical channel is characterized by the recurrence of a particular time slot.

In this example the paging channel consists of the recurring second time slot IT1 of each frame T1, T2, T3, T4, etc.

In accordance with the invention, the choice of one of the antennas A, B to transmit the second time slot IT1 of each frame is pseudo-random. Accordingly, FIG. 2 indicates by which antenna A, B the second time slot IT1 is transmitted. For the first four frames the transmission order is as follows, for example; A, A, B, A.

Accordingly, even if a mobile station $5_1$ through $5_3$ is listening to only one frame in two, it does not always "see" the same antenna. In the example shown in FIG. 2, if a mobile station $5_1$ through $5_3$ listens to only the odd frames T1, T3, etc. it nevertheless "sees" both antennas A, B of the base station because it receives, with the first frame T1, a second time slot IT2 transmitted by one of the antennas (antenna A), and with the third frame T3, a second time slot IT2 transmitted by the other antenna (antenna B)

With the periodic switching law used in the prior art, the transmission order is as follows: A, B, A, B (or B, A, B, A), i.e. a perfect alternation between the two antennas A and B. Consequently, if a mobile station $5_1$ through $5_3$ listens only to the odd frames T1, T3, etc. it "sees" only one of the antennas A.

Figure 3:
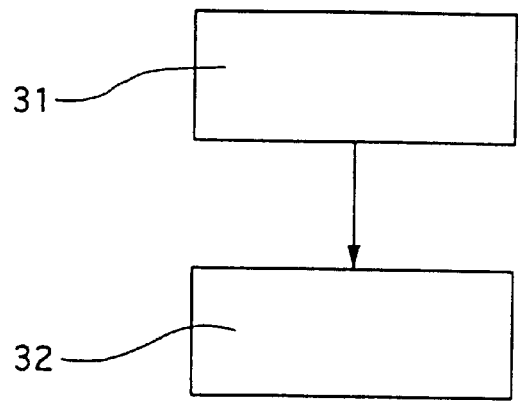
FIG. 3 shows a simplified flowchart of the process in accordance with the invention for transmission of a unidirectional channel by a base station.

A simplified flowchart of the process of the invention for transmission of a unidirectional channel by a base station will now be described with reference to FIG. 3.

This process, which is implemented in a base station 1 as described above, comprises the following steps:

step 31: determining the unidirectional or non-unidirectional character of a channel to transmit, and step 32: switching from one antenna A, B to another in accordance with a random or pseudo-random law if the channel to transmit is unidirectional.

What is claimed is:

1. A radiocommunication system, comprising:

at least one mobile station adapted to operate in said radio communication system; and a base station comprising:

at least two antennas for transmitting a channel to a mobile station, and means for selecting one of said antennas, said selector means comprising:

means for determining when said channel to transmit to said mobile station is unidirectional, and means for switching from one of said antennas to another in accordance with a predetermined random or pseudo-random law, said law to allow for selecting any one of said antennas including the currently transmitting antenna, when said determination means indicates to said switching means that said channel to transmit is unidirectional;

wherein said mobile station, when in an operational idle state, does not listen to said unidirectional channel at every opportunity.

2. The system as claimed in claim 1 wherein said unidirectional channel belongs to the group comprising:

channels designed to be unidirectional, and channels not designed to be unidirectional but temporarily having a unidirectional character.

3. The system as claimed in claim 2 wherein each channel designed to be unidirectional belongs to the group comprising:

broadcast channels each transmitted to a plurality of mobile stations, and

Simplex channels each transmitted to a single mobile station.

4. The system as claimed in claim 2 wherein each broadcast or simplex channel belongs to the group comprising:

traffic channels, control channels,

"dummy bearer" channels,

"beacon" channels.

5. The system as claimed in claim 1 wherein said radiocommunication system belongs to the group comprising:

DECT (Digital European Cordless Telecommunications) type systems,

CT1 (Cordless Telephone 1st Generation) type systems,

CT2 (Cordless Telephone 2nd Generation) type systems,

PCN (Personal Communication Systems) type systems,

GSM (Global System for Mobile communication) type systems, and

DCS 1800 (Digital Communication System) type systems.

6. A process for transmission of a unidirectional channel by a base station of a radiocommunication system, said base station comprising at least two antennas for transmitting a channel, said process comprising the following steps:

determining the unidirectional or non-unidirectional character of said channel to transmit, and switching from one of said antennas to another in accordance with random or pseudo-random predetermined law, said law to allow for selecting any one of said antennas including the currently transmitting antenna, when the channel to transmit is unidirectional wherein, in said system, a mobile station in an operationally idle state does not listen to said unidirectional channel at every opportunity.

7. A radiocommunication system comprising:

a data input module configured to receive transmission data;

an antenna selection module configured to select an antenna for transmitting a channel from at least two antennae based on a random and/or a pseudo-random law, said law to allow for selecting any one of said antennae including the currently transmitting antenna, and to switch to a selected antenna and output said transmission data thereto, when said antenna selection module detects that the channel to transmit to at least one mobile station, adapted to operate in said radiocommunication system, is unidirectional, wherein said mobile station, when in an operationally idle state, does not listen to said unidirectional channel at every opportunity.

* * * * *